Sept. 2, 1941.  G. P. LARGE  2,254,824
WASHING MACHINE
Filed Jan. 4, 1939  2 Sheets-Sheet 1

George P. Large
INVENTOR
BY Victor J. Evans & Co.
ATTORNEYS

Sept. 2, 1941. G. P. LARGE 2,254,824
WASHING MACHINE
Filed Jan. 4, 1939   2 Sheets—Sheet 2

George P. Large
INVENTOR
BY Victor J. Evans & Co.
ATTORNEYS

Patented Sept. 2, 1941

2,254,824

UNITED STATES PATENT OFFICE 2,254,824

WASHING MACHINE

George P. Large, Munising, Mich.

Application January 4, 1939, Serial No. 249,298

3 Claims. (Cl. 141—9)

The present invention relates to new and improved washing machines of the type in which dishes, or other articles, are washed by the discharge of a liquid spray against them.

An important object of the invention is to provide a dish washer including a housing adapted to contain a quantity of water and a dish supporting rack suspended above the water within the housing and including means for effecting the discharge of water from the container against the rack of dishes in liquid spray form whereby said dishes are thoroughly washed.

A further object of the invention is to provide a washing machine having the above mentioned characteristics in which the dish supporting rack is formed with means to prevent sediment and the like from returning to the body of water after contacting the dishes supported within said rack whereby the water may be continuously used until the dishes are thoroughly cleansed.

A further object of the invention is to provide a dish washing machine in which a series of spraying nozzles are mounted about the wall of the casing of the machine and including means for alternately supplying a liquid from within the container to the nozzles whereby all areas of the dishes will be thoroughly cleansed.

The invention will be fully and comprehensively understood from a consideration of the following detailed description when read in connection with the accompanying drawings which form a part of the application.

Figure 1:
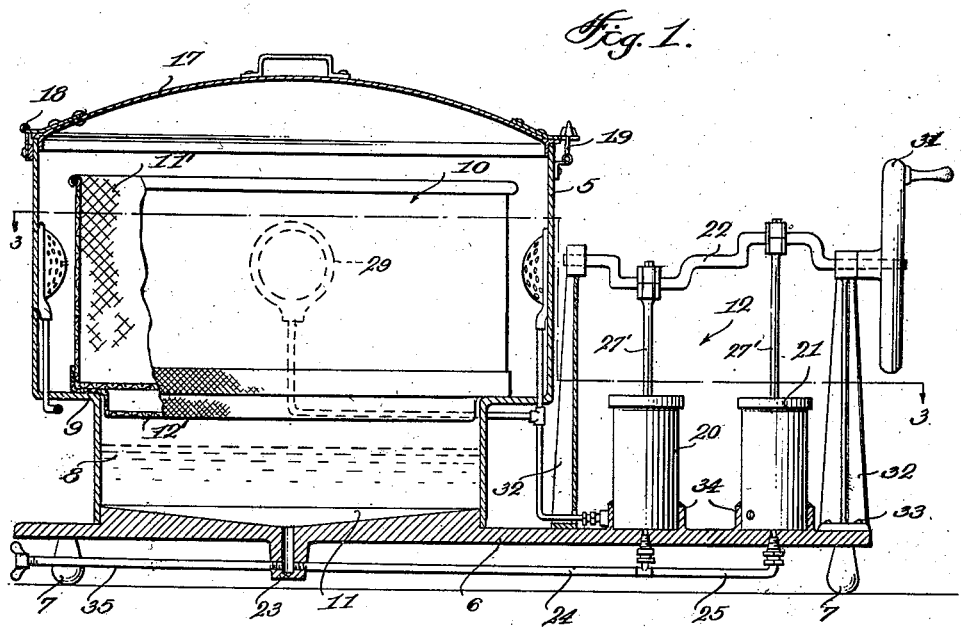
Figure 1 is a longitudinal sectional view of the new and improved washing machine with certain parts thereof in elevation.
Figure 2:
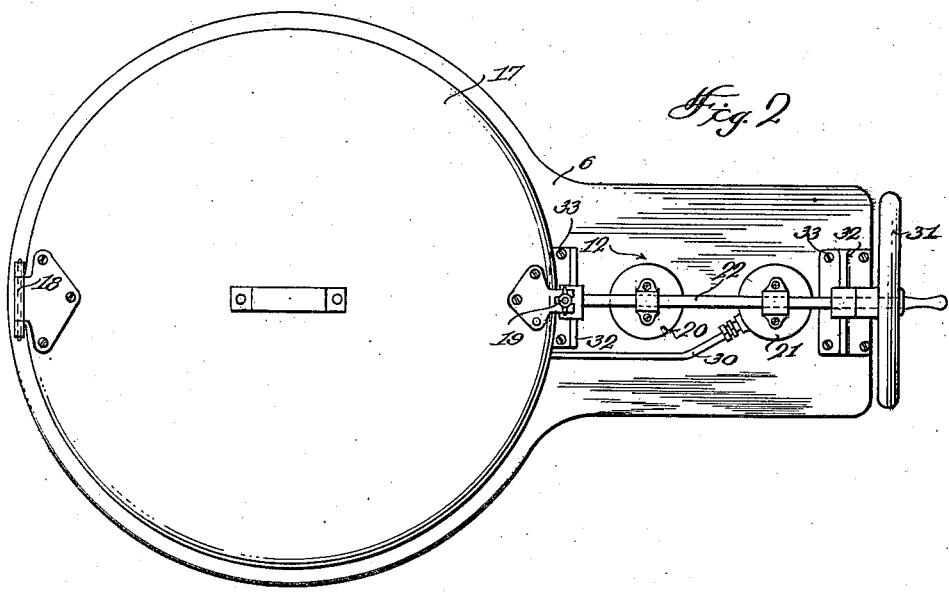
Figure 2 is a top plan view thereof.

Referring to the drawings for a more detailed description thereof, the invention illustrated represents a dish washing machine embodying a substantially cylindrical casing 5 suitably mounted on a base 6, said base being supported on the legs 7. The lower section 8 of the casing 5 is smaller in diameter than the upper section, the formation of which provides an inwardly extending shoulder 9 adapted to support the dish carrying receptacle indicated generally by the reference numeral 10. The portion 11 of the base 6 on which the casing rests is formed with a sloping bottom as clearly shown in Figure 1 of the drawings whereby water contained within the section 8 will be permitted to flow therefrom upon actuation of the pumping mechanism generally indicated at 12. It is to be understood that the side walls of the reduced section 8 are joined to the base 6 with a watertight fitting.

The dish supporting rack 10 is formed of wire or other perforated material 11' and is of a size to firmly rest upon the extending shoulder 9. A sediment retaining receptacle 12' is frictionally attached to the bottom of the rack 10 and is also formed of a perforate material of a smaller mesh than said rack, whereby minute particles of food and sediment will be collected therein and be prevented from returning to the compartment 8. Thus substantially clean water is sprayed on the dishes throughout the continuous process of washing. Provision of the sediment receptacle 12' will also materially reduce the possibility of the pumps and pipes directed thereto becoming clogged.

Figure 3:
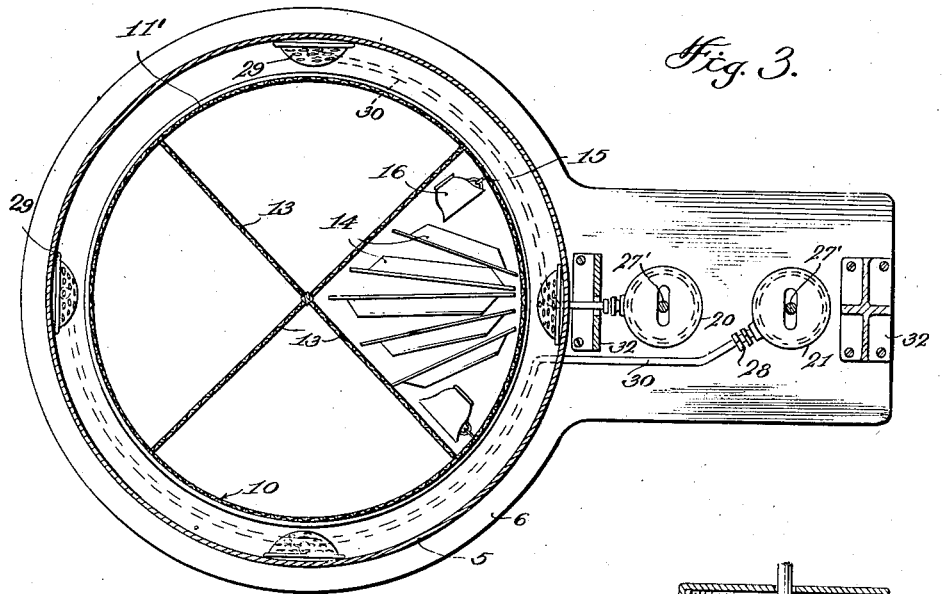
Figure 3 is a sectional view taken substantially on line 3—3 of Figure 1.
Figure 4:
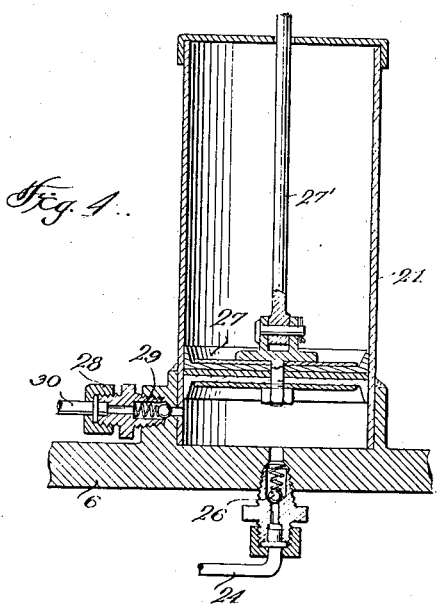
Figure 4 is a sectional view of one of the pumps employed for supplying water to the machine in continuous process.
Figure 5:
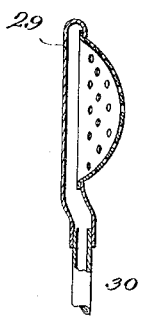
Figure 5 is a detailed sectional view of a spray nozzle.

The rack 10, as shown in Figure 3 of the drawings, is formed with a plurality of vertical segmental partitions 13 providing individual sections for holding in stacked relation dishes, or other similar articles 14. If desired, a series of hooks 15 may be carried by the walls of the rack and within the sections thereof for supporting cups or the like 16.

After positioning the rack containing the dishes to be washed within the casing 5, said casing is closed by means of the cover 17 hinged or otherwise connected to said casing as indicated at 18 and adapted to be clamped thereto by the means 19. Thus it will be seen that a substantially closed receptacle is provided which permits of thoroughly washing the dishes supported within the casing and alleviating any possibility of water being discharged from without the receptacle.

The means for withdrawing water from the compartment 8 and discharging the same in spray form against the dishes comprises a pair of pumps 20 and 21, respectively, said pumps being alternately driven through the crank shaft 22 synchronized to discharge alternately. Each of the pumps is connected with the discharge outlet 23 formed in the base 6 through the pipes 24 and 25, respectively. The coupling ends of said pipes are formed with check valves 26 whereby on the upward stroke of the piston 27, associated with the crank shaft by means of the connecting rod 27', water is drawn into the cylinder through its respective suction pipe and on the downward stroke is discharged through the outlet 28 also formed with a check valve 29.

A series of spray nozzles 29 are disposed in spaced relation within the casing 5 and preferably opposite each of the sections formed by the vertical partitions 13. As indicated in Figure 3 of the drawings, each of the pumps is connected through its outlet 28 and discharge pipe 30 with a pair of nozzles 29 whereby water is sprayed through alternate pairs of said nozzles upon actuation of the pumps. The nozzles 29 are of the type to direct a minute spray of water against the dishes to thoroughly cleanse the same.

The crank shaft 22 may be manually operated through the flywheel 31 suitably journaled on one end of said crank shaft. It is also to be understood that any desired means may be employed for effecting rotation of said crank shaft without departing from the spirit of the invention.

The crank shaft 22 is supported by means of the spaced standards 32 which are bolted or otherwise secured at 33 to the base 6. The cylinders of the pumps 20 and 21 are also fixedly mounted to the base by means of the flanges 34 extending vertically therefrom.

From the above description it is believed that the utility and operation of the herein described dish washer is readily obvious. A quantity of water is initially placed in the bottom portion 8 of the casing 5 and washing powder added thereto. The dishes, or other articles to be washed are stacked within the sections of rack 10 whereupon rotation of the crank shaft 22 will alternately actuate the pumps 20 and 21, respectively, to discharge the water through alternate pairs of the spray nozzles 29 against the dishes. The water will drain from the rack into the bottom of the casing and the pumping process is continued until the dishes have been thoroughly cleaned. Particles of food and sediment will be collected within the receptacle 12' thereby preventing the entrance of foreign matter into the pump structure and its associated parts. After the dishes have been thoroughly washed, water is drained from the section 8 through the valve controlled drain 35 attached to the outlet 23. Cleansing of the casing and pump can be effected by placing clean water within the receptacle and actuating the pump mechanism permitting the water to be discharged through the outlet 23 and drain 35.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed is:

1. In a dishwashing machine having a base and casing mounted thereon with a dish supporting receptacle located within said casing and the lower end of said casing forming a liquid reservoir, said receptacle having perforated side and bottom walls, a sediment collecting member removably attached to the bottom wall of said receptacle, said sediment collecting member having a bottom wall formed of perforated material and normally spaced from the bottom wall of said receptacle, the perforations of said sediment collecting member being of a lesser diameter than the perforations of said receptacle, whereby minute particles of food will be collected therein while permitting passage of liquid therethrough, spray means mounted within said casing adapted to discharge liquid into said receptacle, and means for supplying liquid to the spray means from said reservoir.

2. In a dish washing machine having a casing and a receptacle located within said casing, the lower end of said casing being of a lesser diameter than the upper end thereof to form a reservoir having an inwardly extending shoulder for supporting the bottom wall of said receptacle so as to position the same substantially centrally of said casing, the reduced end of said casing forming a container for liquid to be discharged in said receptacle, and a perforated sediment collecting member removably attached to the bottom wall of said receptacle and depending within the lower end of said casing, whereby minute particles of food will be collected therein while permitting passage of liquid therethrough.

3. In a dish washing machine having a casing and a receptacle located within said casing, said receptacle being formed of a perforated material and adapted to support dishes therein, the lower end of said casing being of a lesser diameter than the upper end thereof to form a reservoir having an inwardly extending shoulder for supporting the bottom wall of said receptacle so as to position the same substantially centrally of said casing, the reduced end of said casing forming a container for liquid to be discharged in said receptacle, and a perforated sediment collecting member removably attached to the bottom wall of said receptacle and depending within the lower end of said casing, the perforations of said sediment collecting member being of a lesser diameter than the perforations of said receptacle, whereby minute particles of food will be collected therein while permitting passage of liquid therethrough.

GEORGE P. LARGE.